United States Patent

[11] 3,549,071

[72] Inventors Jack Beery
Farmington, Mich.;
Harold E. Hepp, Dayton, Ohio
[21] Appl. No. 756,009
[22] Filed Aug. 28, 1968
[45] Patented Dec. 22, 1970
[73] Assignee The National Cash Register Company
Dayton, Ohio
a corporation of Maryland

[54] ANGULARLY ADJUSTABLE DRIVE COUPLING
17 Claims, 5 Drawing Figs.
[52] U.S. Cl. ............................................. 226/108,
226/195; 64/24
[51] Int. Cl. .................................................. B65h 23/18
[50] Field of Search ....................................... 226/195,
188, 108; 64/24(Inquired)

[56] References Cited
UNITED STATES PATENTS
| | | | |
|---|---|---|---|
| 2,425,218 | 8/1947 | Worthington | 64/24(UX) |
| 2,810,275 | 10/1957 | Peterson, Jr. | 64/24 |
| 3,020,775 | 2/1962 | Musser | 64/24X |

*Primary Examiner*—Allen N. Knowles
*Attorneys*—Louis A. Kline, Wilbert Hawk, Jr. and George J. Muckenthaler ABSTRACT: An adjustment mechanism for a recording-type business machine having input and output record material drive elements and including a cam assembly movable along a driven shaft for changing the angular rotational relationship between a driving pulley and the driven shaft. The cam assembly includes a splined hub or cylinder cam on the shaft and journaled in a box cam member, the hub having external helical splines cooperative with mating grooves in the driving pulley for establishing the drive coupling between the pulley and the shaft. The box cam member has an external camming race engageable with a plunger-type element on the machine and effective for axially moving the cam assembly when it is actuated by a rotatably lever member, the cam member being carried on a ball bearing, so that adjustment of the coupling and of the drive can be made in either the static or the dynamic condition. The machine main drive shaft carries a similar splined hub and pulley arrangement for further changing the angular relationship between the main shaft and the main drive pulley to reposition the record material drive elements for matching a desired print line with the printing characters.

PATENTED DEC22 1970

INVENTORS
JACK BEERY
HAROLD E. HEPP

BY Louis A. Kline
Wilbert Hawk, Jr.
Geo. J. Muckenthaler

THEIR ATTORNEYS

ANGULARLY ADJUSTABLE DRIVE COUPLING

BACKGROUND OF THE INVENTION

With the advent of high speed record material handling being apparatus, for example, in a high speed printer, it becomes increasingly important that the use of improved devices for exact control of the record material receive top priority in the design of such apparatus. One of the problems, which has been apparent for some time in a high speed printer, is that of maintaining control over certain conditions of the record material as it is being advanced through the machine, especially in those instances concerning the tension of the record material. Conditions may be such that the material is being held or drawn too tightly by the advancing mechanism, or the material may be running in a slack or loosely held condition. If the tension is too great, the paper or other record medium may be damaged or torn by the tractor drive mechanisms in advancing the paper through the machine, and, on the other hand, if the paper is slack and traveling in a wavy condition, so as not to present a relatively straight surface for the printing apparatus, such recording or printing apparatus will not be able to apply a clear and precise mark or imprint on the paper. Additionally, if the paper is not running under proper tension, it may not follow a straight and true path in its travel through the machine, thereby creating a slanted or curved print line. Accordingly, efforts have been made to include mechanism for selectively changing the tension in the record material as it is being advanced through such a printing machine.

A second problem encountered in the high speed printer has been the difficulty of matching the printing characters to a preprinted form in those instances wherein the positioning of the form paper is important, so that the matter to be printed is placed at a specific location. As is well known, it is extremely important, when adding information to such preprinted forms, that the information be printed at an exact location, so as to avoid confusion by the reader. A common expedient employed to change the angular relationship between a driving element and a driven element in rotating shaft machines is an adjustable hub or similar eccentric device; however, devices of this type are generally limited to those conditions wherein the machine is in the static, or "at rest," condition.

The prior art shows various methods and means for adjusting the components of a machine to solve or at least alleviate one or both of these problems. For instance, the prior art shows a pair of coacting spiral-toothed gears on parallel shafts, where one of the gears is fixed against rotation apart from its shaft and is movable longitudinally along the face of the other fixed gear, by means of a lever and fork, to effect partial turning movement of the one gear for controlling its shaft rotational positioning, as seen in U.S. Pat. No. 790,833, issued May 23, 1905, on the application of Coleman B. Harris. Such prior art likewise shows the use of knob and screw controlled slides, oppositely directed, which are pivotally interconnected for repositioning the centers of drive sprockets, with a resultant change in belt tension, and a tiltable fork for raising and lowering the sprockets for adjusting the print line, as seen in U.S. Pat. No. 3,006,520, issued Oct. 31, 1961, on the application of Frank R. House. Additionally, the prior art includes a belt pulley supporting plate which is adjustably rotatable by means of a gear engaging with a geared section of the plate to effect a change in length of one belt section in relation to another section for controlling paper tension, as shown in U.S. Pat. No. 3,049,276, issued Aug. 14, 1962, on the application of Robert E. Wilkins; and it further includes a combined apparatus for varying the tension and adjusting the line of print of a paper web form by means of helical gears supported and driven by a common drive, and collar and sleeve means for controlling translational positioning of the gear housings and thereby rotational adjustment of the several drive shafts, all as shown in U.S. Pat. No. 3,152,742, issued Oct. 13, 1964, on the application of Gerard C. Wright. Finally, the prior art also shows adjusting means by use of idler rollers which are movable over a predetermined arc, in one aspect of this type, and rollers which vary the effective length of the inner reach of the belt, thus altering the rotational position of the drive shaft.

While the prior art teaches the use of certain devices for making adjustments in the record material advancing apparatus, it is desirable to also provide in the adjusting mechanism a form of positive drive coupling in the angular relationship between an input member and an output member, so as to insure proper tension and positioning of the record material in its travel through the machine. In other words, the drive coupling should be so constructed that changes can be made in the tension or in the position of the paper by angular adjustment of the driven shaft in relation to the driving member under both static and dynamic conditions while maintaining a positive drive connection. These high speed machines should not be shut down for the purpose of making minor adjustments in paper tension or for repositioning the paper a minute amount; therefore, the structure of the present invention is provided for making the adjustments under both conditions.

SUMMARY OF THE INVENTION

The present invention relates to an adjustment mechanism combined with a form of positive drive coupling, and more particularly to a cam assembly and timing pulley arrangement which operates to control the angular positioning of a driven shaft whereby the adjustment can be made under static conditions when the machine is at rest, or under dynamic conditions while the driving member and the driven member are continuously rotating. This arrangement is especially adaptable for use in high speed business equipment, and, therefore, the present invention will be shown and described as applicable in a high speed printer which has a plurality of tractor mechanisms of the type having pins for driving the record material in its travel through the machine. The adjustment mechanism selectively controls the rotational positioning of the tractor drive shaft, and, therefore, the record material (in the case of business forms or the like) is carried through the printer with proper longitudinal tension, so that the printing device or character strikes a clear and precise mark. The adjustment mechanism also controls the position of the tractor drive shafts, so that the record material form is properly aligned with respect to the printing device.

In the particular machines to which this invention is applicable, the tractor mechanisms are supported on spaced parallel shafts, and the record material, of the continuous forms type, is carried by the tractor mechanisms through the printing station. The printer is capable of printing speeds upwards of two thousand lines per minute, so it is very important that the record media be precisely controlled by the tractors during the time the print hammers are operating at these high speeds. The invention utilizes a timing or adjusting pulley which performs as an output drive element and which drives a tractor shaft through a cam assembly including a splined hub portion, a shiftable box cam element, and lever and plunger means working together for shifting the cam element rotationally and axially along the shaft for the purpose of repositioning the driven shaft in relation to the timing pulley. The driven shaft, which is splined along its length, carries the timing pulley operably driven by a belt which is connected to be driven by a second pulley carried on an input or main drive shaft. The second pulley (the main drive pulley) is of sufficient width to carry two belts in side-by-side relationship, so that the main shaft drives the upper and lower tractor mechanisms. While in one aspect the present invention deals with and covers the structure for changing the tension of the paper extending between the upper and lower tractors, the invention is particularly directed to and will be described in one embodiment as an adjustable drive coupling for the lower tractor.

As mentioned above, a cylinder cam or splined hub is carried by the driven shaft and cooperates with the timing pulley in that the helical splines on the exterior surface of the cylinder cam engage and mate with companion recesses or grooves around the interior periphery of the pulley. A lever member is rotatably carried on a shaft on the machine adjacent the driven shaft and includes a stud projecting from one side thereof, which is engageable with the shiftable box cam assembly for moving the assembly in a rotational direction. A plunger or slidable pin on the machine simultaneously engages with a helical camming race on the exterior of the box cam assembly, so that, as the lever is rotatably moved, the cam assembly is likewise carried axially along the driven shaft, thus causing the helical splines on the hub to movingly engage with the recesses of the timing pulley and rotate the shaft to a new position. Under static conditions, and as the splined hub is turned slightly, the driven shaft, by reason of being connected therewith through the shaft splines, also turns, with the timing pulley remaining fixed against rotation, and this angular adjustment is carried through the driven shaft to the tractor mechanism.

When the lever is rotated counterclockwise, as viewed from a specified end (right) of the driven shaft, the cam assembly is urged to the right along the shaft, and the helical splines engage with the grooves in the timing pulley to rotate the driven shaft clockwise along with the tractors thereon to release tension in the paper. Rotation of the lever in a clockwise, or opposite, direction from that mentioned urges the cam assembly towards the left, with the driven shaft being turned counterclockwise and the result being to increase tension in the paper. Since the movement to the mechanism is rotationally and axially applied, the tractors are subjected to a form of fine adjustment to maintain proper tension in the paper. Under dynamic conditions, rotation of the control handle moves the box cam element around and along the shaft to change the angular relationship between the driving pulley and the driven shaft through the splined hub and helical groove arrangement, this being most easily accomplished by reason of the box cam element's being carried on a ball bearing which provides the journal for the rotating hub parts in the operating condition.

In a second embodiment, and in addition to the use of such splined hub and timing pulley on the driven shaft to control the paper tension, similar mechanism is carried on the machine main drive shaft, so that, as the splined hub is rotationally and axially moved, the main driving pulley is rotationally displaced, and both driven shafts are displaced likewise, thus moving the tractors slightly to reposition the record paper. Again, an adjusting lever is employed to rotate on a shaft, and, through a spool or drum and cable arrangement, the splined hub engages with the recesses in the pulley and rotationally adjusts the driven shafts and the tractors to a new position. Clockwise rotation of the lever causes rotation of the driving pulley in relation to the main shaft (which shaft remains fixed in relation to the pulley under static conditions) for repositioning both tractor mechanisms and the paper in one direction, and counterclockwise rotation of the lever shifts the tractors and the paper in the other direction. Clockwise rotation of the lever moves the driving pulley and both tractor mechanisms counterclockwise to lower the paper, which in effect raises the printing on the paper.

In view of the above discussion, the principal object of the present invention is to provide an adjustment mechanism for maintaining proper tension of the record material being advanced through a printing station.

An additional object of the present invention is to provide a helical drive coupling which insures precise angular rotation between an output drive element and a driven shaft.

A further object of the present invention is to provide a cam assembly for controlling the rotational positioning of the drive and driven elements for a tractor mechanism.

Another object of the present invention is to provide a helical drive coupling between a main drive shaft and a driving pulley for adjusting the line of print on record material carried by the tractor mechanisms.

Additional advantages and features of the present invention will become apparent and fully understood from a reading of the following description taken together with the annexed drawings, in which.

Figure 1:
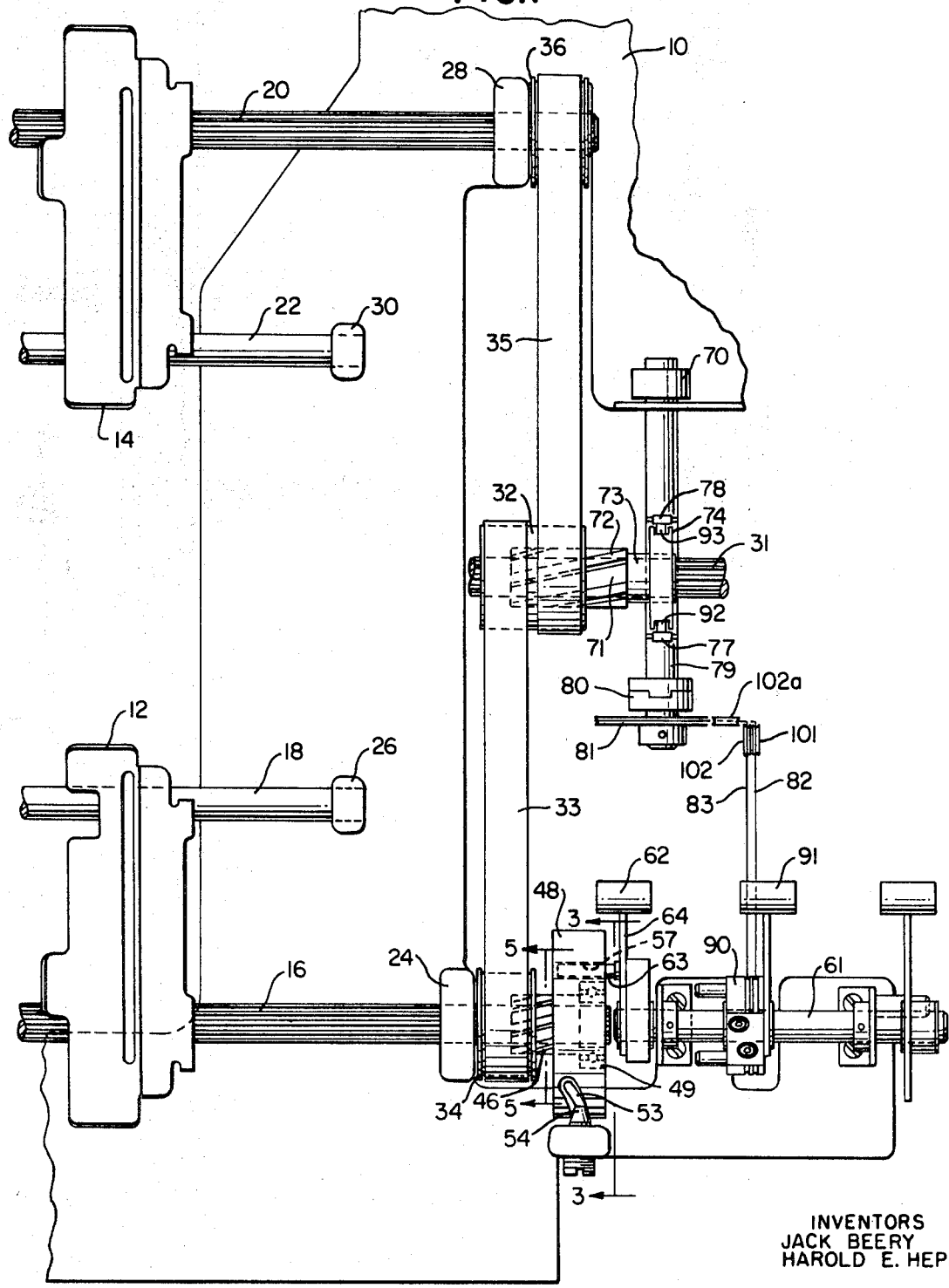
FIG. 1 is a view in front elevation of a part of the right-hand side of a high speed printer incorporating the present invention, certain control elements being shown in diagrammatic form.
Figure 2:
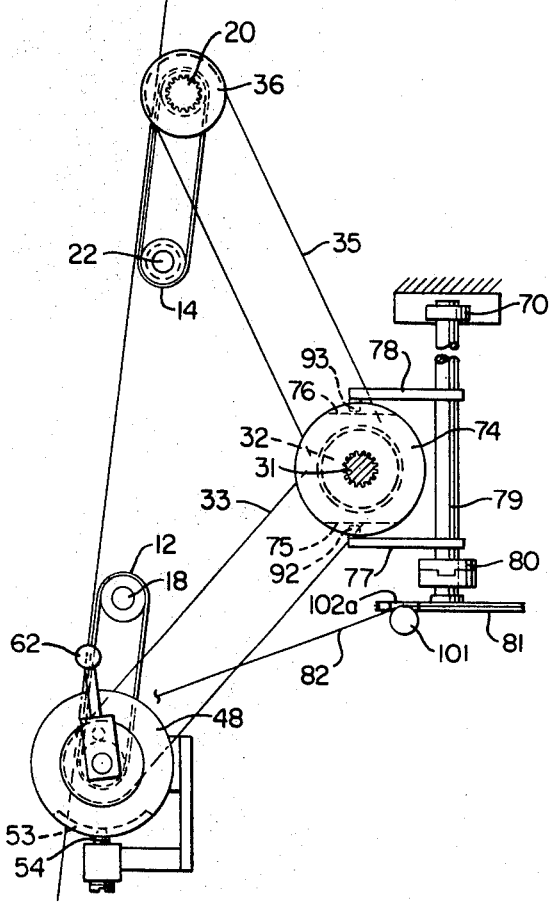
FIG. 2 is a view in side elevation of the structure shown in FIG. 1, on a reduced scale and again with certain parts being shown in diagrammatic form.

As seen in FIGS. 1 and 2, the invention is shown as a part of and included within a record material handling portion of a high speed printer, wherein the record material, such as paper or the like, is rapidly advanced past a printing station. Since the invention deals with and covers a drive mechanism for the material advancing apparatus of such printer, only that portion of the printer structure will be shown and described. The record material handling mechanism generally includes upper and lower, right and left, tractors connected to a common drive and having thereon pins which are positioned to engage apertures along the edges of the paper for driving and advancing the paper past the printing station. Each tractor mechanism is carried on a driven shaft and a supporting shaft, the driven shaft being connected to the common drive and splined along its length to accomodate a drive sprocket, and the supporting shaft being a smooth shaft for suitably carrying an idler or adjusting sprocket. FIGS. 1 and 2, respectively, illustrate front and side views of the printer, which generally includes a frame structure 10 supporting the various shafts and the paper-advancing tractor mechanisms. The illustrated right-hand tractor mechanisms 12 and 14 are shown and described in detail in a pending application for U.S. Letters Patent, Ser. No. 726,396, filed May 3, 1968, in the names of Harold E. Hepp and Roger W. Biser, said application now issued as U.S. Pat. No. 3,507,431, dated Apr. 21, 1970. The tractor 12 is carried on shafts 16 and 18, the shaft 16 being splined for driving the sprocket and the tractor, and the shaft 18 being the smooth idler or support shaft. The tractor 14 is carried on similar shafts 20 and 22, splined and smooth, respectively. Suitable bearings 24, 26 nand 28, 30 are supported from the frame 10 for journaling these shafts, and, of course, like bearings (not shown) are provided to carry the left ends of the shafts with the left-hand tractors (also not shown) thereon. This type of paper-advancing mechanism is well known, and therefore it will not be further described except as it pertains to the present invention.

Figure 4:
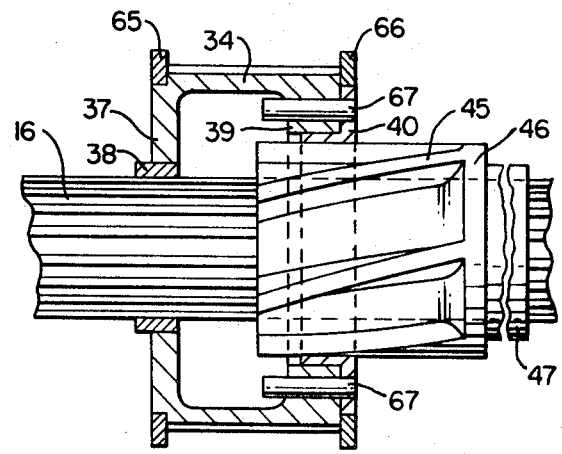
FIG. 4 is a sectional view of the timing pulley assembly on the lower tractor drive shaft.

A main drive shaft 31 (FIG. 1) extends from the right side of the printer and is suitable supported therefrom to drive the tractors 12 and 14 by means of specific drive elements. The shaft 31 carries a pulley member 32, which, through a drive coupling (to be described later), imparts rotational motion to the tractor shafts 16 and 20. To differentiate between the various driving and driven parts, the main shaft 31 and the pulley 32 will be referred to as the driving members, and the shafts 16 and 20 as the driven members. An intervening belt member 33 interconnects the pulley 32 with a lower, adjusting or timing pulley 34, rotatably carried by the associated shaft 16. As seen in FIG. 4, the pulley 34 is provided with belt-retaining rims 65 and 66, secured thereto by any suitable means, such as bonding or the like. A second belt member, 35, is trained around the main pulley 32 and an upper timing pulley 36 for driving the shaft 20 and hence the tractor 14. The pulley 36, of course, has mating grooves to fit the splines on the shaft 20. The main shaft 31 is equidistant from the driven shafts 16 and 20 (FIG. 2), so that the belts 33 and 35 are of equal length to insure optimum continuity in driving the tractors.

Figure 5:
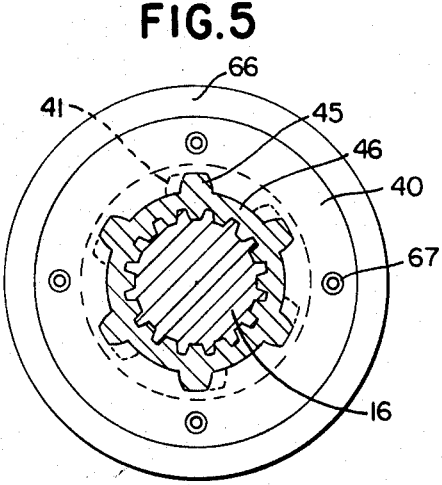
FIG. 5 is a view taken along the line 5-5 of FIG. 1.

The pulley 34, on the other hand, has one end portion 37 (FIG. 4) carried free on the shaft 16—that is, with the interior diameter of a bushing 38 presenting a smooth surface which coincides with the shaft splined diameter, so as to rotate and slide thereon. The other end of the pulley 34 has a wall 39, of interior diameter larger than that of the bushing 38, and to which is suitably secured, as by roll pins 67 or the like (FIG. 5), a cap-end cam 40 having a plurality of interior helical grooves or recesses 41. Working within the right end of the cam 40—that is, along the grooves 41—are helical teeth 45 on the exterior diameter of a cylindrical hub or cam 46, which hub is grooved along its interior diameter to match the splines for shifting movement along the shaft 16, as shown in FIGS. 4 and 5.

Figure 3:
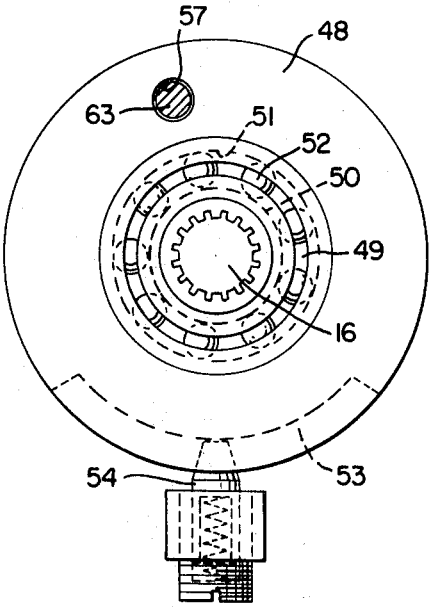
FIG. 3 is a view taken along the line 3-3 of FIG. 1.

Rotatable on a reduced diameter portion 47 of the cylindrical cam 46—that is, the right end in FIGS. 1 and 4 as opposed to the toothed portion 45 thereof—is a box cam member 48 having formed therein an exterior camming race 53, which is positioned to be engageable with a fixed plunger 54 supported on the frame of the machine (FIGS. 1 and 3). The plunger 54 is spring-loaded, so that it is constantly urged into engagement with the race 53, which defines a helical path around a portion of the circumference of the cam 48. As seen in FIGS. 1 and 3, the cam 48 is supported for smooth and free rotation on a bearing 49 including an inner race 50, an outer race 51, and bearing balls 52.

Thus far, and again referring to FIG. 1, the main shaft 31 carries a driving pulley 32, around which are trained the driving belts 33 and 35, one extending to the upper timing pulley 36 and the other extending to the lower timing pulley 34. Since the first portion of the following description will cover the mechanism for changing the tension in the record material carried through the machine, only the lower timing pulley 34 and the parts associated therewith are shown in detail in FIGS. 3, 4, and 5. The shaft 16, as mentioned above, will be referred to as a driven shaft as distinguished from the main shaft 31, and the timing pulley 34 as a driving pulley in distinguishing it from the main drive pulley 32. In this respect, the pulley 34 and the shaft 16 are connected by a novel coupling, which is included as an important part of the present invention.

As mentioned above, the timing pulley 34 includes the cap-end cam 40 having the helical grooves or recesses 41, which are formed around its interior periphery and which mate with the companion helical splines 45 on the cylinder cam or splined hub 46. The other end of the timing pulley 34 carries the round, smooth bushing 38 journaled over the splines of the driven shaft 16 for maintaining said other end in alignment on the shaft. The box cam is cylindrical in shape (FIG. 1) and is carried by means of the ball bearing 49 on the smooth portion 47 of the splined hub 46, and it also includes a bore 57 therethrough, which is off center from the driven shaft 16, as best seen in FIG. 3. Associated with the box cam 48 and rotatably carried on a shaft 61, separate from the driven shaft 16 but in axial alignment therewith (FIG. 1), is a box cam actuating handle 62, which includes a stud 63 projecting from one side of an arm portion 64, parallel to the shaft 16. The stud 63 is positioned to slidably engage in the bore 57 of the box cam. The action of the stud 63 within the bore 57, together with the camming race 53 along the exterior surface of the box cam 48 as engaged by the spring-loaded plunger 54, moves the helically splined hub 46 along the shaft 16 as the box cam 48 is turned or rotated on the smooth portion 47 of the hub 46. The specific arrangement of the camming race 53 and the plunger 54 forces the box cam along the shaft 16 as the handle 62 is rotated, which, in turn, moves the splined hub 46 likewise therealong.

The positioning of the parts including the driven shaft 16, the splined hub 46, the box cam 48, and the timing pulley 34, is such that, when the handle 62 is rotated in a certain direction, the stud 63 revolves around the shaft 61, simultaneously sliding in the bore 57 in the cam assembly 48, and, at the same time, the camming race 53 is moved along the spring-loaded plunger 54. The camming race runs to the right and to the left of the peripheral center line on the cam 48 and, with the aid of the plunger 54, provides axial shifting movement of the cam 48 and the hub 46. For instance, if the handle 62 is rotated clockwise around its shaft 61 as observed from the right end thereof (FIG. 1), the box cam 48 is moved towards the left and along the shaft 16 under control of the fixed plunger 54 engaging its camming race 53, in turn shifting the splined hub 46 along the driven shaft 16 and into further engagement with the driving or timing pulley 34. During this movement of the splined hub 46 along the shaft 16, and assuming that the timing pulley 34 is fixed against rotation on the shaft 16 at such time, it is clear that the action of the helical teeth 45 of the splined hub 46 upon the companion grooves 41 within the pulley cam 40 will cause the shaft 16 to turn counterclockwise slightly. That is, with the pulley 34 appropriately held at rest, as one example, nonmovement of the belt 33 upon fixing of the main shaft against rotation, axial movement of the splined hub 46 within the fixed pulley 34 causes the hub 46 to rotate and likewise carry the splined shaft 16 therewith.

In this first instance of drive coupling operation, where the mechanism is described for changing and/or maintaining tension in the record material in a static condition, the driven shaft 16 will thus be rotated by reason of the action of the helical splines 45 on the cylinder hub 46 engaging with the helical grooves 41 in the cap-end cam 40 of the timing pulley 34. As the handle 62 is moved clockwise, the box cam 48 likewise moves clockwise, and, since the timing pulley 34 is stationary, the leftward movement of the splined hub 46 along the driven shaft 16 to further engage with the pulley 34 causes the driven shaft 16 to be turned in the opposite, or counterclockwise, direction, and, since the lower tractor 12 is likewise splined on the driven shaft 16, such tractor will of course be moved in the same rotational direction, thus effecting a change between the two tractor mechanisms 12 and 14, the upper tractor 14 being at rest—with the lower tractor 12 essentially "backing up" to increase the tension in the paper or like record material.

Of course, counterclockwise rotation of the handle 62 moves the associated parts in the direction opposite from that described above and thereby effects a lesser tension or slackening of the record material. It is thus seen that, if the timing pulley 34 is held fixed or stationary, rotation of the cam assembly 48 and the splined hub 46 will cause rotational translation of the driven shaft 16 as a result of the meshing of the helical teeth 45 of the hub with the helical recesses 41 in the cam pulley.

This adjustment or change in the tension of the record material can also be made under dynamic conditions by reason of the box cam 48 being carried on the ball bearing 49 situate on the smooth portion 47 of the splined hub 46, so that the adjustment can be made when the machine is in operation. Under this condition, the pulley 34 is driving the splined hub 46 (the hub turning with the pulley), and the hub 46 is driving the shaft 16. A close tolerance is maintained in the fit between the splined hub 46 and the timing pulley 34, so that any adjustment or change in the drive coupling is smooth and in effect infinitely variable to maintain the desired tension in the record material. It should be noted that, since one end of the timing pulley includes the smooth bushing 38 over the splined driven shaft 16, the connection between the splined hub 46 and the groove end cam 40 of the timing pulley 34 comprises the entire drive coupling between the pulley 34 and the driven shaft 16. It is therefore by reason of this splined hub and pulley arrangement that the shaft is positively driven and, at the same time, is angularly adjustable to provide the desired tension in the record material.

A similar splined hub structure, but with a slightly different coupling and control arrangement, is provided to reposition the record material and thus adjust the line of print in relation to the printing apparatus. In this second instance of drive coupling, the driven shafts 20 and 16 for the upper and lower tractors 14 and 12 are angularly displaced from the main drive shaft 31, but are adjustably rotated with the main drive pulley 32. As seen in FIG. 1, the main shaft 31 likewise carries a splined hub 71 thereon, the hub 71 having interior grooves mating with the corresponding splines of the main shaft. The hub 71 is similar to the hub 46, previously described, and is fitted to the main shaft 31 identical with that construction shown in FIG. 5; however, the helically splined portion 72 is elongated, so as to provide greater axial engagement with the wider main drive pulley 32.

As previously described for the lower timing pulley 34, the main pulley 32 also includes helical recesses or grooves in one end portion thereof. Journaled on the smooth end portion 73 of the splined hub 71 is a disc member 74 (also see FIG. 2) having upper and lower circumferential cutouts 75 and 76 for reception of fingered portions of outstanding arms 77 and 78 carried on a shaft 79, which, by means of a suitable support bearing 70, is supported for rotation from the machine framework. The disc 74 and the splined hub 71 are maintained in such a relationship that they move axially as a unit along the main shaft 31.

One end of the shaft 79 carries a clutch member 80 along with a pulley 81, around which are trained control cables 82 and 83 (FIGS. 1 and 2). Since there may be a tendency for the splined hub 71 to "back out" of the main pulley 32 under operating conditions, the clutch 80 is employed to maintain the parts in the desired position as set by the operator. The pulley 81 is fixed to the shaft 79, and the control cables 82, 83 are secured to the pulley, from which they extend around respective guide pulleys 101 and 102 and thence run to a reel or drum 90 carried on the support shaft 61, which shaft is in line with the lower driven shaft 16 and which shaft carries the various adjusting handles or levers (FIG. 1). A pulley 102a is associated with the pulley 102, so that the cable 83 can turn the corner from the top of the pulley 81. The cable 82 is trained over the pulley 101 and under the pulley 81. A handle 91, rotatably supported on the shaft 61, is secured to the drum 90 for changing the angular position of the upper and lower driven shafts 20 and 16 in relation to the main shaft 31, through the cable and pulley arrangement, and hence the position of the upper and lower tractors 14 and 12. As the handle 91 is moved around the shaft 61, the cables 82 and 83 are displaced and rotate the pulley 81 with the shaft 79, in turn swinging the arms 77 and 78 in an axial direction along the shaft 31. As illustrated in FIGS. 1 and 2, the arms 77 and 78 include the fingers 92 and 93, which slidably engage the cutouts 75 and 76 in the disc 74 on the main drive shaft splined hub 71, which arrangement causes the disc 74 and the splined hub 71 to be axially moved along the main drive shaft 31, and, by reason of the engagement of the helical splines 72 of the hub 71 with the grooves in the main pulley 32, likewise causes the main pulley to be rotated slightly. At the same time, the drive belts 33 and 35 carry this motion to the driven shafts 16 and 20 for displacing the tractors 12 and 14, so as to reposition the record material according to a desired print line.

Under this aspect of the invention, the main shaft 31, when in the machine nonoperating, or static, condition, is held against rotation, and the main drive pulley 32 rotates according to the axial translation of the disc 74 and the splined hub 71 along the shaft. Since the shaft 31 is held stationary, the pulley 32 rotates in one direction, which, in turn, displaces the upper and lower timing pulleys 36 and 34 an equal amount to change the position of the print line. When the handle 91 is raised (turned clockwise as viewed from the right end of the shaft 61), the drum 90 is rotated likewise clockwise, with the cables 82 and 83 winding thereon and unwinding therefrom to rotate the pulley 81 counterclockwise, as seen from the clutch end of the shaft 79 in FIG. 1. Rotation of the pulley 81 turns the shaft 79 and swings the arms 77 and 78, which, through the fingers 92 and 93 engaging the cutouts 75 and 76 in the disc 74, urges the disc 74 and the splined hub 71 leftwardly along the shaft 31 to move the hub further within the main pulley 32. This causes the main pulley 32 to be rotated counterclockwise (viewed from the right end of the main shaft 31) and in turn rotate both timing pulleys 34 and 36 and associated tractors 12 and 14 in that direction, which lowers the record material and in effect raises the line of print thereon.

It is thus seen that herein shown and described is a mechanism, in the form of a drive coupling for one of the driven shafts, for angularly adjusting the shaft to maintain proper tension in the record material traveling past a printing station, or to change the tension in such record material. The same drive coupling principle is used for the machine main drive shaft to adjust the line of print on the record material with respect to the printing apparatus.

While only one embodiment has been disclosed, variations on the present invention may occur to those skilled in the art, which variations would fulfill the advantages and features of the mechanism as described above, so it is contemplated that all such variations having these features are within the scope of the invention.

We claim:

1. A drive coupling for changing the angular position of a driven shaft in relation to a driving shaft of a business machine, including:
   a drive member carried on said driven shaft, said member having an end portion defining helically directed recesses on the interior diameter thereof;
   drive means connecting said driving shaft and said drive member;
   a hub member slidably supported on said driven shaft, said hub member defining helically directed splines on the periphery thereof and positioned to engage with the recesses in said end portion; and
   means circling the hub member and engageable therewith for shifting said hub member along said driven shaft so as to angularly adjust said driven shaft in relation to said drive member by reason of the helical movement of said splines in said recesses.

2. A coupling in accordance with claim 1 wherein said means for shifting includes a rotatable member on said hub member and actuating means for sliding said rotatable member along said driven shaft.

3. A coupling in accordance with claim 2 wherein said actuating means includes a camming race on said rotatable member and means engageable with said camming race for urging said rotatable member along said shaft.

4. A drive coupling for adjustably rotating a driven shaft in relation to a driving shaft of a business machine having record material advancing tractor mechanisms, including:
   a pulley having an end portion rotatable on said driven shaft, and having another end portion defining interior helical recesses;
   drive means connecting said driving shaft and said pulley;
   a cam member journaled on and slidable along said driven shaft, the member having a camming race on the exterior thereof;
   a hub on said driven shaft having exterior helical splines thereon cooperable with said recesses; and
   actuating means on said machine adjacent said cam member and engageable therewith for rotating said member and for displacing the member along said driven shaft by reason of said actuating means being engageable with said camming race to urge the exterior splines of the hub into sliding engagement with the interior recesses of the pulley for adjusting said driven shaft and one of said tractor mechanism.

5. A coupling in accordance with claim 4 wherein said actuating means includes handle means rotatable on said machine and having stud means slidably engageable with said cam member:

6. A coupling in accordance with claim 4 wherein said actuating means includes plunger means on said machine engageable with said camming race and cooperable in response to rotation of the handle means for axially moving said hub along said driven shaft.

7. A paper-tensioning mechanism for a high speed printer having a main drive shaft, a driven shaft carrying a paper advancing tractor mechanism thereon, and means drivingly connecting said shafts, said mechanism including a driving pulley rotatable on said driven shaft, said pulley having an end face defining helical grooves on the interior diameter thereof;

a hub splined on said driven shaft, said hub defining helically running teeth on the periphery thereof and adapted to engage with the grooves in said end face;

cam means journaled on said hub and having an offset bore therethrough and a curved recess on the periphery thereof;

lever means rotatably carried on said printer adjacent said cam means and having a stud slidable in said offset bore; and plunger means fixedly carried on said printer and connecting with said curved recess whereby rotation of said lever means rotates said cam means and axially displaces the cam means and the hub along the shaft, whereupon engagement of the hub teeth with the pulley end face grooves angularly rotates said driven shaft and said tractor mechanism in relation to the main drive shaft for changing the tension in said paper.

8. A mechanism in accordance with claim 7 including a bearing on said hub for carrying said cam means and thereby permitting change in the tension of said paper during printer operating conditions.

9. An adjustment mechanism for varying the tension in record material being advanced through a high speed printer having a pair of tractor mechanisms carried by driven shafts, including:

a drive member carried on one of said driven shafts, said member having an end portion defining helically directed recesses on the interior diameter thereof;

a hub member slidably supported on said one shaft, said member defining helically directed splines on the periphery thereof and positioned to engage with the recesses in said end portion;

cam means journaled on said hub member and movable along said one shaft; and means for rotating and for moving said cam means about and along said one shaft for shifting said hub member therealong so as to angularly adjust said one shaft and one of said tractor mechanisms in relation to said drive member by reason of movement of said splines in said recesses.

10. A mechanism in accordance with claim 9 including a helically directed camming race on said cam means, and a plunger on said printer for engagement in said race to urge said hub member along said one driven shaft as said cam means is rotated.

11. A mechanism in accordance with claim 9 wherein said means for rotating said cam means includes a lever on said printer adjacent to and having stud means slidably engageable with said cam means.

12. In a high speed printer having a frame and a pair of driven shafts supported from the frame with record material advancing tractor mechanisms thereon, mechanism for changing the tension in the record material comprising:

a timing pulley rotatable on one of said shafts and having a shaft-free end portion including a plurality of involuted recesses therein:;

a hub member splined on said one shaft and adapted to be movable therealong, and including exterior splines involutely bearing around said member and positioned to engage with said pulley recesses;

cam assembly journaled on said hub member and having a camming race therein; and means supported from said frame and engageably connected with said cam assembly and with said camming race for rotating and for axially moving said cam assembly and said hub member by reason of said exterior splines moving in said pulley recesses for angularly adjusting said one shaft and one of said tractor mechanisms in relation to the timing pulley.

13. In a printer in accordance with claim 12 including a bore in said cam assembly, a handle rotatably supported on said printer and having a stud thereon slidably cooperable with said bore to carry the cam assembly with said handle, and a plunger riding in said camming race for urging said hub member along said one shaft simultaneous as said handle is rotated.

14. An adjustable drive coupling for use in a business machine having driven shafts supporting record material carrying tractor mechanisms, a main drive shaft, and drive means connecting said main and driven shafts, said coupling comprising;

a driving pulley having an end portion rotatable on said driven shaft, and having another end portion defining interior helical recesses;

a hub member slidably connected with said main shaft, and defining splines angularly directed about the periphery of said member and positioned to mate with said pulley recesses;

cam assembly journaled on said hub member and adapted to slide along said main shaft therewith; and actuating means on said machine for moving said hub member and said cam assembly along the main shaft, thereby urging said splines to move in said recesses for axially displacing said hub member and for angularly adjusting said driving pulley and said driven shafts in relation to said main shaft to reposition said record material.

15. A drive coupling in accordance with claim 14 wherein said actuating means includes a handle-operated reel and cable assembly on said machine for moving said cam assembly and said hub member along said main shaft.

16. A drive coupling in accordance with claim 15 including a disc journaled on the hub member and a shaft member carrying swingable arms for engaging with said disc to axially move said hub member upon rotation of said shaft by said reel and cable assembly.

17. A drive coupling in accordance with claim 16 including a clutch on said shaft member for maintaining the shaft in a desired angular position.